Dec. 30, 1924.  
J. HUDRY  
VELOCIPEDE  
Original Filed Dec. 3, 1920   2 Sheets-Sheet 2
1,521,540
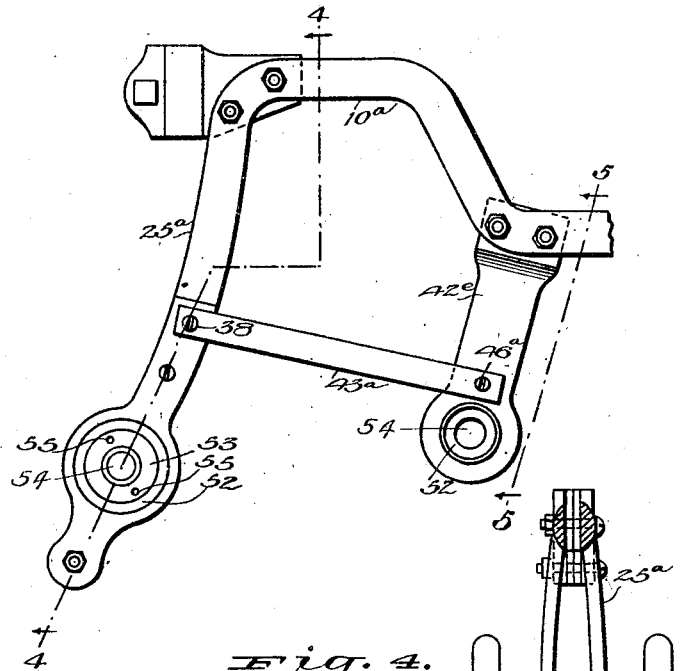
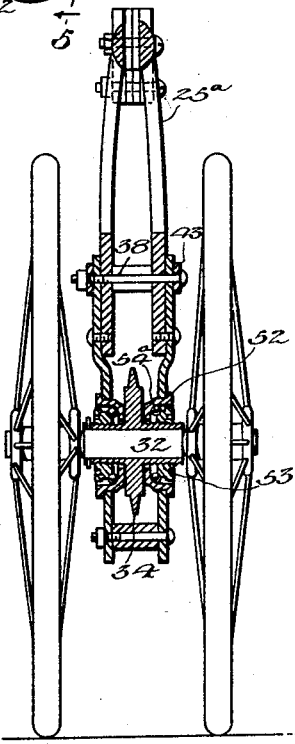
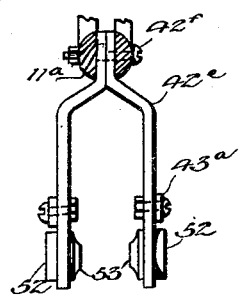
WITNESSES
INVENTOR  
John Hudry  
BY  
ATTORNEYS Patented Dec. 30, 1924.

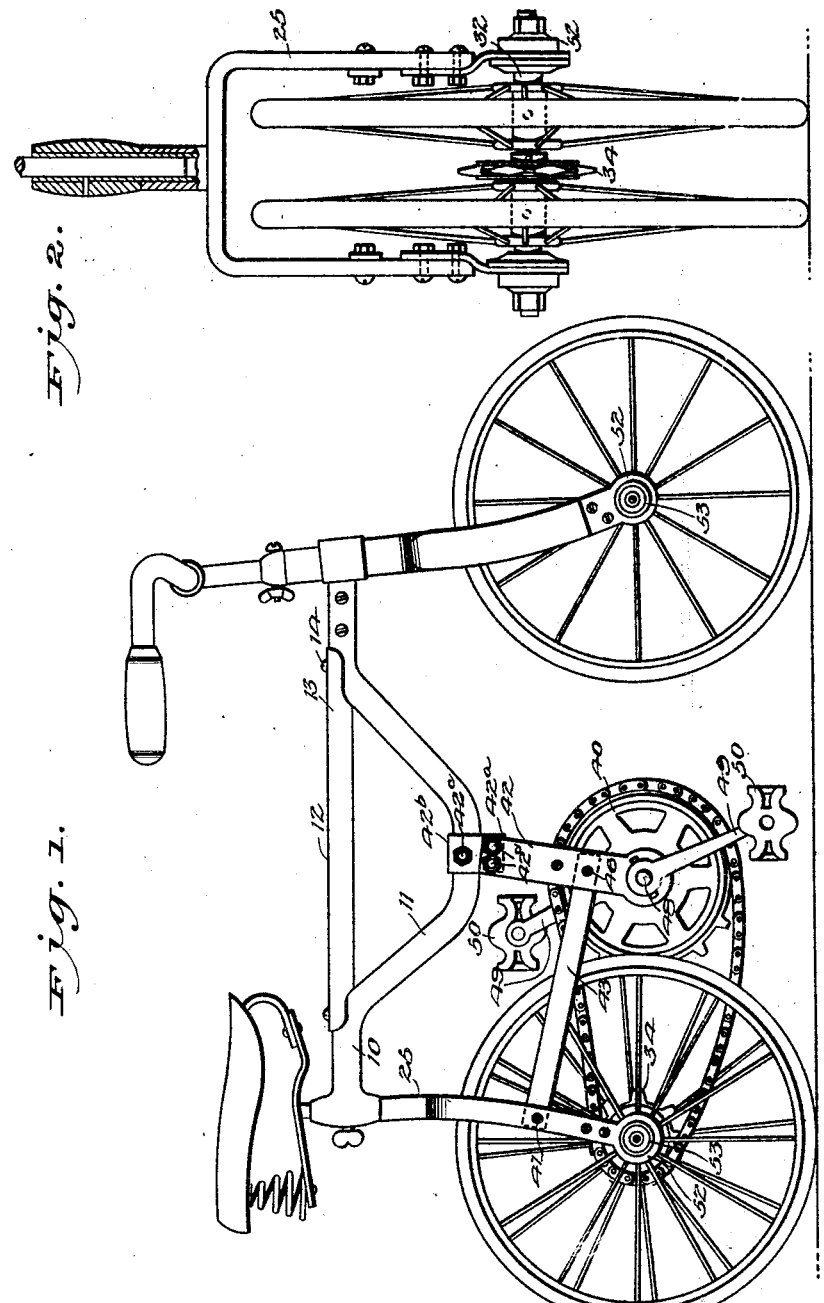

1,521,540

UNITED STATES PATENT OFFICE.

JOHN HUDRY, OF ANCON, CANAL ZONE, PANAMA.

VELOCIPEDE.

Original application filed December 3, 1920, Serial No. 428,046. Divided and this application filed July 27, 1922. Serial No. 577,868.

*To all whom it may concern:*

Be it known that I, JOHN HUDRY, a citizen of the United States of America, temporarily residing in Ancon, Canal Zone, Panama, have invented a new and Improved Velocipede, of which the following is a description.

My invention relates to a velocipede adapted to be converted from one type of vehicle into another and embodying features relating to the adjustment and adaptation of the frame, to a particular arrangement of the wheels and drive, as well as features involving the folding or the knockdown character of the vehicle, the invention being in the same general line as previous structures patented by me, as follows: Number 1,218,943, granted March 13, 1917; Number 1,274,045, granted July 30, 1918; and Number 1,326,148, granted December 23, 1919. The present application is a division of an application December 3, 1920, Serial No. 428,046, resulting in Patent No. 1,434,701.

My present invention is more particularly intended for embodiment in a velocipede involving a chain and sprocket drive and in which provision is made for adapting the chain and sprocket drive either to a single rear wheel in a plane approximately at the medial line of the velocipede or to a pair of rear wheels disposed at opposite sides of the medial line.

The general object of the present invention is to provide ball bearings in the frame parts of the machine for an axle adapted to receive ordinary non-ball bearing wheels usually employed in the construction of children's velocipedes, whereby to give the wheels ball bearing support without the necessity of employing special makes of wheels having ball bearings in the hubs thereof. The present invention has especially in view bearings of a character to be coordinated in a knockdown velocipede having a chain and sprocket drive.

Reference is to be had to the accompanying drawings forming a part of this specification, it being understood that the drawings are merely illustrative of practical examples of the invention in its different arrangements.

Figure 1 is a side elevation of a velocipede embodying my improved bearings in connection with a sprocket and chain drive coordinated in this instance with a pair of rear wheels between the members of the rear fork;

Figure 2 is a rear view of the rear fork with a pair of wheels;

Figure 3 is a side elevation of frame parts including the backbone, rear fork integral therewith, and a hanger to be hereinafter referred to;

Figure 4 is a transverse section on the line 4—4, Figure 3, the view showing a pair of wheels disposed outside of the rear fork;

Figure 5 is a detail in cross section on the line 5—5 of Figure 3, the hanger being slightly modified over that shown in Figure 1;

Figure 6 is a vertical section showing a modification of the bearing in which the cup is stamped up integrally with the frame member.

In the illustrated example of my invention a backbone designated generally by the numeral 10 is provided, said backbone having a drop 11 therein as in a girl's velocipede. In the form shown a tubular piece 12 bridges the drop 11, the ends having cut-outs so that the upper portion of said bar at the ends presents concavo-convex terminals to conform to the transverse rounded form of the backbone and to the bends at the juncture of the drop 11 and the straight portions of the backbone. The ends 13 may be suitably held by removable fastening means such as screws 14. The bridge-piece 12, or equivalent bridge-piece, when in place over the drop 11 and secured at its ends, not only lends to the backbone the appearance of that of a boy's velocipede but lends strength to the backbone to withstand the rough usage to which a velocipede may be expected to be subjected by boys.

In making provision for the chain and sprocket drive, a drive sprocket 40 is provided and a chain runs over said drive sprocket and over the driven sprocket 34. The drive sprocket 40 is mounted on an axle 48 having the cranks 49 provided with pedals 50. Said axle 48 turns in a forked hanger 42 here shown as consisting of separate side straps secured by screws or bolts 42$^d$ to the depending parallel ends 42$^a$ of a strap 42$^b$ looped about the drop 11 centrally of the latter and secured thereto by a transverse bolt 42$^c$. Longitudinal girts 43 are secured at their ends to the hanger 42 by suitable fasteners 46 and the rear ends of said girts are secured by suitable fasteners 47 to the members of the rear fork 25.

In the form of the backbone and rear fork shown in Figures 3 to 5 the girts 43ª are secured at their front ends as at 46ª to a hanger 42ᵉ and at their rear ends by the bolt 38 to rear fork 25ª. The hanger 42ᵉ is formed of straps the offset upper ends of which are suitably fastened as by bolts or screws 42ᶠ between the sections of the drop portion 11ª of backbone 10ª.

In making provision for the embodiment of a chain and sprocket drive in a tricycle or in the converted bicycle form of the invention with the one wheel at the rear, I make provision for mounting the turnable elements in ball bearings notwithstanding these elements in themselves are of a non-ball bearing type including the running wheels and the sprocket wheels. The object is carried out by embodying ball bearing elements in the frame parts such as the forks and hangers. I provide fixed cup bearing elements 52 rigid with the different rear forks and hangers and suitably made fast therein by brazing or otherwise, the cups constituting one element in the ball race, the coacting element consisting of an internally threaded retainer ring 53 applied to the axle, the fixed bearing element 52 presenting a central opening 54 through which the axle 32 passes freely. The form of the said bearing elements 52, 53 is shown clearly in Figure 4. The balls 54ª and the retaining ring 53 thus are free to turn with the turning of the axle and relatively to the fixed bearing element 52 of the frame. Thus, with the running wheels and sprockets fast on the axle and turning therewith, effective ball bearings are provided without employing special wheels embodying ball bearings therein, the ordinary child's bicycle or tricycle wheel being thus made available and at the same time ball bearings are provided for the axles mounting the respective wheels. Substantially the same bearing elements are present in Figures 1 and 2 and in Figures 3 to 5. The retaining rings 53 of the bearings may be provided as shown in Figure 3 with wrench holes or recesses 55.

In Figure 6 the frame member 25ᶜ has the rigid bearing element 52ª stamped up integrally from the frame member.

I would state in conclusion that while the illustrated examples constitute practical embodiments of my invention, I do not limit myself strictly to the mechanical details herein illustrated, since, manifestly, the same can be considerably varied without departure from the spirit of the invention as defined in the appended claim.

Having thus described my invention, I claim:

In a velocipede, a frame including a front fork having an axle therein, a rear fork having an axle therein, and a support for a drive shaft, together with ball bearings in said rear fork and said support for the rear axle and the shaft respectively, said bearings comprising cups separate from the frame but rigid with the rear fork and with said support respectively and presenting openings through which the axle and shaft respectively extend, ball retainer rings on the axle and the shaft to turn therewith, said retainer rings forming with said cups ball races, and balls in said races.

JOHN HUDRY.